United States Patent
Hughes

(10) Patent No.: US 8,423,351 B2
(45) Date of Patent: Apr. 16, 2013

(54) SPEECH CORRECTION FOR TYPED INPUT

(75) Inventor: Christopher Thaddeus Hughes, Redwood City, CA (US)

(73) Assignee: Google Inc., Mountain View, CA (US)

( * ) Notice: Subject to any disclaimer, the term of this patent is extended or adjusted under 35 U.S.C. 154(b) by 376 days.

(21) Appl. No.: 12/709,129

(22) Filed: Feb. 19, 2010

(65) Prior Publication Data

US 2011/0208507 A1 Aug. 25, 2011

(51) Int. Cl.
*G06F 17/27* (2006.01)

(52) U.S. Cl.
USPC ...... 704/9; 704/1; 704/10; 704/231; 704/251; 715/255; 715/256; 715/257

(58) Field of Classification Search ......... 704/1, 10, 704/231, 251; 715/255, 256, 257
See application file for complete search history.

(56) References Cited

U.S. PATENT DOCUMENTS

| | | | | |
|---|---|---|---|---|
| 6,018,736 A * | 1/2000 | Gilai et al. | ............ | 1/1 |
| 6,256,630 B1 * | 7/2001 | Gilai et al. | ............ | 1/1 |
| 6,401,060 B1 * | 6/2002 | Critchlow et al. | ............ | 704/1 |
| 6,424,983 B1 * | 7/2002 | Schabes et al. | ............ | 715/257 |
| 7,143,043 B1 * | 11/2006 | Vandermeijden | ............ | 704/275 |
| 7,243,305 B2 * | 7/2007 | Schabes et al. | ............ | 715/257 |
| 7,720,682 B2 * | 5/2010 | Stephanick et al. | ............ | 704/252 |
| 7,853,874 B2 * | 12/2010 | Schabes et al. | ............ | 715/257 |
| 7,881,936 B2 * | 2/2011 | Longe et al. | ............ | 704/257 |
| 2002/0099542 A1 * | 7/2002 | Mitchell et al. | ............ | 704/231 |
| 2002/0138265 A1 * | 9/2002 | Stevens et al. | ............ | 704/251 |
| 2003/0220788 A1 * | 11/2003 | Ky | ............ | 704/235 |
| 2004/0102971 A1 * | 5/2004 | Lipscher et al. | ............ | 704/236 |
| 2005/0005240 A1 * | 1/2005 | Reynar et al. | ............ | 715/533 |
| 2005/0131687 A1 * | 6/2005 | Sorrentino | ............ | 704/235 |
| 2005/0203751 A1 * | 9/2005 | Stevens et al. | ............ | 704/276 |
| 2005/0283364 A1 * | 12/2005 | Longe et al. | ............ | 704/257 |

(Continued)

FOREIGN PATENT DOCUMENTS

EP 1 619 661 A2 1/2006

OTHER PUBLICATIONS

International Search Report and Written Opinion of the International Searching Authority for International Application No. PCT/US2010/049561, mailed Jan. 20, 2011, 10 pages.

(Continued)

*Primary Examiner* — David R Hudspeth
*Assistant Examiner* — Lamont Spooner
(74) *Attorney, Agent, or Firm* — Shumaker & Sieffert, P.A.

(57) ABSTRACT

A method, computer program product, and system are provided for correcting one or more typed words on an electronic device. The method can include receiving one or more typed words from a text input device and generating one or more candidate words for the one or more typed words. The method can also include receiving an audio stream at the electronic device that corresponds to the one or more typed words. The audio stream can then be translated into text using the one or more candidate words, where the translation includes assigning a confidence score to each of the one or more candidate words. Based on the confidence score associated with each of the one or more candidate words, a candidate word can be selected among the one or more candidate words to represent each portion of the text. A word from the one or more typed words can be replaced with the selected candidate word based on the value of the confidence score associated with the selected candidate word.

30 Claims, 8 Drawing Sheets

U.S. PATENT DOCUMENTS

| | | | |
|---|---|---|---|
| 2006/0129387 A1* | 6/2006 | Mitchell et al. | 704/201 |
| 2006/0190256 A1* | 8/2006 | Stephanick et al. | 704/252 |
| 2007/0011609 A1* | 1/2007 | Adjouadi et al. | 715/700 |
| 2008/0052073 A1* | 2/2008 | Goto et al. | 704/251 |
| 2008/0120102 A1* | 5/2008 | Rao | 704/235 |
| 2008/0195388 A1* | 8/2008 | Bower et al. | 704/243 |
| 2008/0282154 A1 | 11/2008 | Nurmi | |
| 2009/0125299 A1* | 5/2009 | Wang | 704/201 |
| 2009/0183078 A1* | 7/2009 | Clement et al. | 715/723 |
| 2009/0216531 A1* | 8/2009 | Yanagihara | 704/235 |
| 2009/0228273 A1* | 9/2009 | Wang et al. | 704/235 |
| 2009/0319266 A1* | 12/2009 | Brown et al. | 704/235 |
| 2010/0031143 A1 | 2/2010 | Rao et al. | |
| 2011/0043652 A1* | 2/2011 | King et al. | 348/222.1 |
| 2012/0094259 A1* | 4/2012 | Lipsky et al. | 434/169 |
| 2012/0262488 A1* | 10/2012 | Liu et al. | 345/649 |

OTHER PUBLICATIONS

International Preliminary Report on Patentability of the International Search Authority, International Application No. PCT/US2010/049561, mailed Aug. 30, 2012, 7 pgs.

* cited by examiner

SPEECH CORRECTION FOR TYPED INPUT

BACKGROUND

1. Field

This description generally relates to correction of input on an electronic device.

2. Background

A common feature on electronic devices is the entering, editing, and manipulation of text in device applications. Such device applications include, for example, text messaging and email. However, a challenge in these device applications is entering the text free of errors, as the electronic device oftentimes includes small keyboards or touchscreens. This challenge becomes further exacerbated when the electronic device user is on the move rather than in a more convenient, stationary position to correct errors in the text. In addition, even when the electronic device user is in a convenient and stationary position, it is often difficult for the mobile device user to position a text cursor to a portion of the text that requires correction.

Methods and systems are needed for correction of one or more typed words on electronic devices to overcome the above-noted challenges in device applications requiring text entry.

SUMMARY

Embodiments include a method for correcting one or more typed words on an electronic device. The method includes receiving one or more typed words from a text input device and generating one or more candidate words for the one or more typed words. The method also includes receiving an audio stream at the electronic device that corresponds to the one or more typed words. The audio stream can be translated into text using the one or more candidate words, where the translation includes assigning a confidence score to each of the one or more candidate words and selecting a candidate word among the one or more candidate words to represent each portion of the text based on the confidence score of the selected candidate word. A word from the one or more typed words can be replaced with the corresponding selected candidate word when the confidence score of the selected candidate word is above a predetermined threshold value.

Embodiments additionally include a computer program product that includes a computer-usable medium with computer program logic recorded thereon for enabling a processor to correct one or more typed words on an electronic device. The computer program logic includes the following: first computer readable program code that enables a processor to receive one or more typed words from a text input device; second computer readable program code that enables a processor to generate one or more candidate words for the one or more typed words; third computer readable program code that enables a processor to receive an audio stream at the electronic device that corresponds to the one or more typed words; fourth computer readable program code that enables a processor to translate the audio stream into text using the one or more candidate words, where the translation of the audio stream includes assignment of a confidence score to each of the one or more candidate words and selection of a candidate word among the one or more candidate words to represent each portion of the text based on the confidence score of the selected candidate word; and, fifth computer readable program code that enables a processor to replace a word from the one or more typed words with the corresponding selected candidate word when the confidence score of the selected candidate word is above a predetermined threshold value.

Embodiments further include a system for correcting one or more typed words on an electronic device. The system includes a text input device, a language model builder, a microphone, a speech recognizer, and a text update manager. The text input device is configured to receive one or more typed words. The language model builder is configured to generate one or more candidate words for the one or more typed words. The microphone is configured to receive an audio stream that corresponds to the one or more typed words. The speech recognizer is configured to translate the audio stream into text using the one or more candidate words, where translation of the audio stream comprises assignment of a confidence score to each of the one or more candidate words and selection of a candidate word among the one or more candidate words to represent each portion of the text based on the confidence score of the selected candidate word. Further, the text update manager is configured to replace a word from the one or more typed words with the corresponding selected candidate word when the confidence score of the selected candidate word is above a predetermined threshold value.

Further features and advantages described herein, as well as the structure and operation of various embodiments, are described in detail below with reference to the accompanying drawings. It is noted that the following description is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments and, together with the description, further serve to explain the principles herein and to enable a person skilled in the relevant art to make and use the embodiments described herein.

DETAILED DESCRIPTION

The following detailed description refers to the accompanying drawings that illustrate exemplary embodiments. Other embodiments are possible, and modifications can be made to the embodiments within the spirit and scope of the detailed description.

It would be apparent to one of skill in the relevant art that the embodiments, as described below, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

Figure 1:
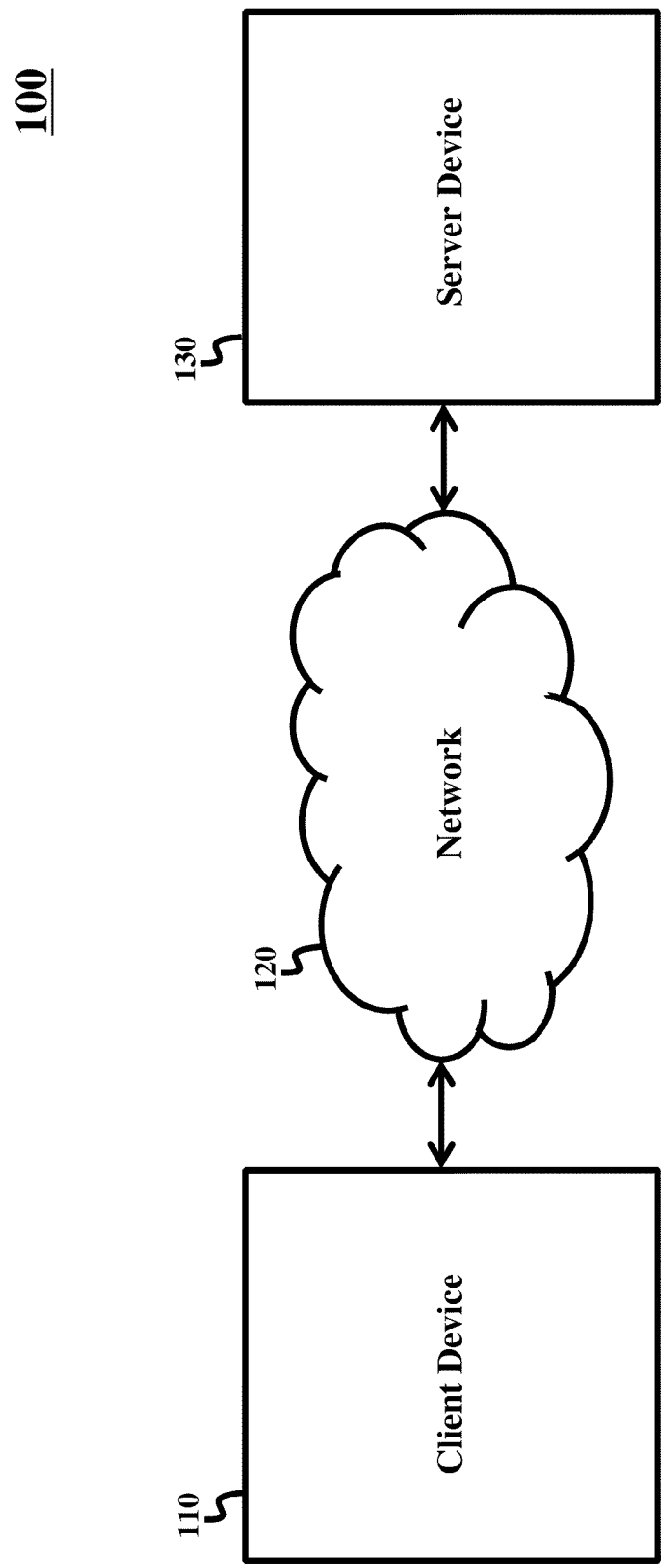
FIG. 1 is an illustration of an embodiment of an exemplary communication system in which embodiments can be implemented.

FIG. 1 is an illustration of an exemplary communication system 100 in which embodiments described herein can be implemented. Communication system 100 includes a client device 110 that is communicatively coupled to a server device 130 via a network 120. Client device 110 can be, for example and without limitation, a mobile phone, a personal digital assistant (PDA), a laptop, or other similar types of mobile devices. Server device 130 can be, for example and without limitation, a telecommunications server, a web server, or other similar types of database servers. In an embodiment, server device 130 can have multiple processors and multiple shared or separate memory components such as, for example and without limitation, one or more computing devices incorporated in a clustered computing environment or server farm. The computing process performed by the clustered computing environment, or server farm, may be carried out across multiple processors located at the same or different locations. In an embodiment, server device 130 can be implemented on a single computing device such as, for example and without limitation, a stand-alone device that is not integrated within client device 110 or on client device 110. Examples of computing devices include, but are not limited to, a central processing unit, an application-specific integrated circuit, or other type of computing device having at least one processor and memory. Further, network 120 can be, for example and without limitation, a wired (e.g., Ethernet) or a wireless (e.g., Wi-Fi and 3G) network that communicatively couples client device 110 to server device 130. In another example, if server device 130 is integrated on the same device as client device 110, then network 120 can be represented as, for example and without limitation, an internal bus of client device 110 that communicatively couples server device 130 to other processes executed on client device 110.

Figure 2:
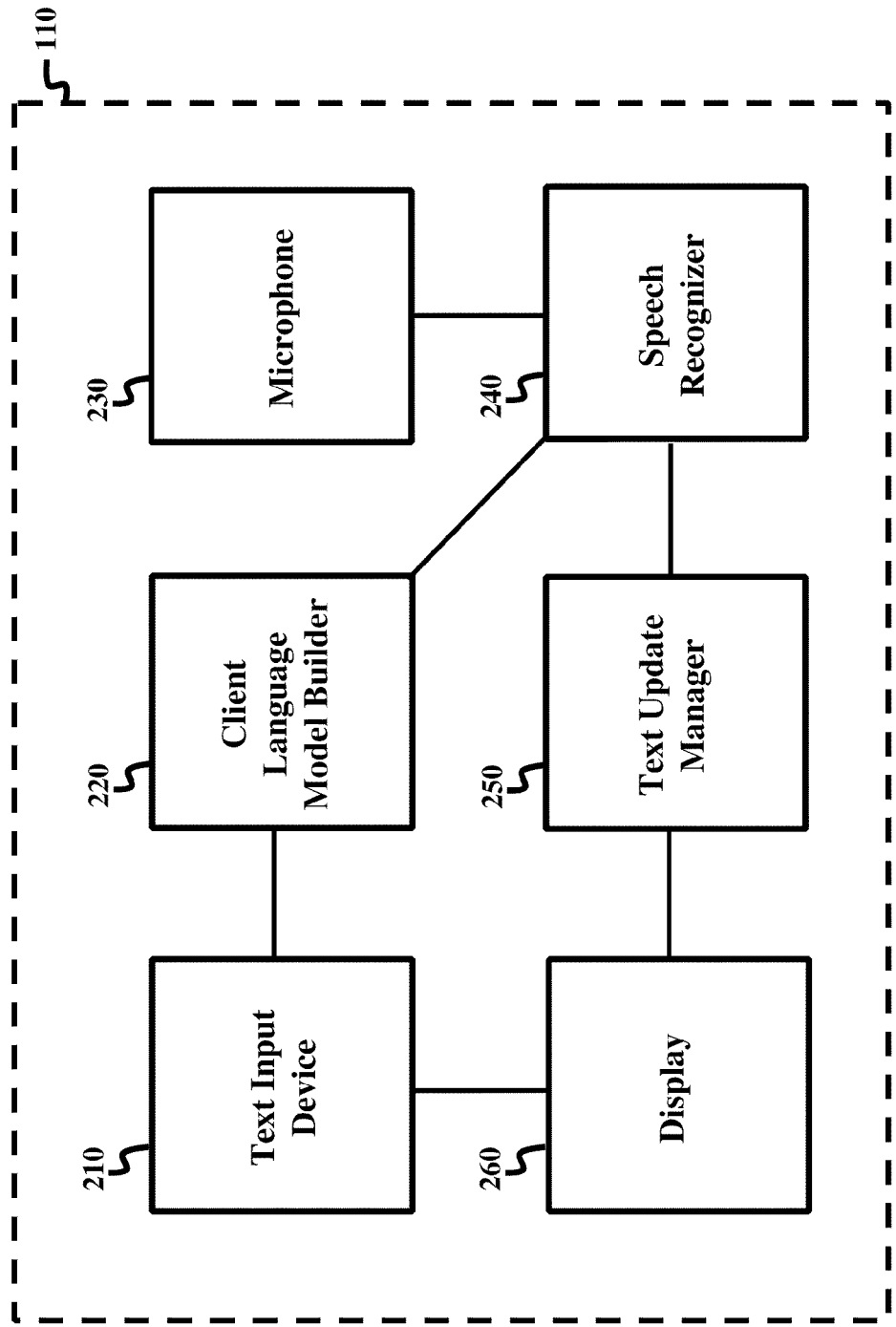
FIG. 2 is an illustration of an embodiment of a client device.

FIG. 2 is an illustration of an embodiment of client device 110. Client device 110 includes a text input device 210, a client language model builder 220, a microphone 230, a speech recognizer 240, a text update manager 250, and a display 260. In an embodiment, text input device 210 is coupled to client language model builder 220 and display 260. Display 260 is coupled to text update manager 250, which is coupled to speech recognizer 240, according to an embodiment. In an embodiment, speech recognizer 240 is coupled to client language model builder 220 and microphone 230.

In an embodiment, client language model builder 220, speech recognizer 240, and text update manager 250 can be implemented in software, firmware, hardware, or a combination thereof. Embodiments of client language model builder 220, speech recognizer 240, and text update manager 260, or portions thereof, can also be implemented as computer-readable code executed on one or more computing devices capable of carrying out the functionality described herein. Examples of computing devices include, but are not limited to, a central processing unit, an application-specific integrated circuit, or other type of computing device having at least one processor and memory.

In an embodiment, text input device 210 is configured to receive one or more typed words from a client device user. Text input device 210 can be, for example and without limitation, a QWERTY keyboard, a touchscreen, or a T9 keyboard. The text input from text input device 210 can be displayed on display 260, according to an embodiment. Based on the description herein, a person of ordinary skill in the relevant art will recognize that the embodiments described herein can be applied to telephony-based systems that may not have a display (e.g., display 260). In these telephony-based systems, a voice output system may be used to speak back to the telephone user the one or more typed words. Telephony-based systems are within the scope and spirit of the embodiments described herein.

Client language model builder 220 is configured to generate one or more candidate words for each of the one or more typed words, according to an embodiment. In an embodiment, a finite state transducer (FST) is used to generate the one or more candidate words, where the FST is used to represent a language model that contains the one or more candidate words. An embodiment of the FST is described in further detail below with respect to method 400 of FIG. 4. As understood by a person of ordinary skill in the relevant art, FSTs can be used to represent speech recognition language models such as, for example and without limitation, Hidden Markov, tree lexicon, and n-gram language models.

In an embodiment, client device 110 transmits the one or more typed words from text input device 210 to server device 130 via network 120 of FIG. 1. After server device 130 processes the one or more typed words, which will be described in further detail below, client language model builder 220 (in client device 110) receives additional candidate words for each of the one or more typed words via network 120, according to an embodiment. The transmission of data to and reception of data from server device 130 can be performed using a transceiver (not shown) located in client device 110, which is known by a person of ordinary skill in the relevant art.

In reference to FIG. 2, in an embodiment, microphone 230 is configured to receive an audio stream corresponding to the one or more of the typed words received by text input device 210. The audio stream can be generated from an audio source such as, for example and without limitation, the client device user and corresponds to one or more portions of the typed input into client device 110, according to an embodiment. Microphone 230 can be configured to detect speech activity from, for example and without limitation, the client device user substantially at the same time, soon after, or during a period of time client device 110 receives the typed input. Methods and techniques for voice activity detection are known to a person of ordinary skill in the relevant art.

Speech recognizer 240 is configured to translate the audio stream received by microphone 230 into a text string using the one or more candidate words from client language model builder 220, according to an embodiment. In an embodiment, speech recognizer 240 selects a candidate word from the one or more candidate words (generated by client language model builder 220) to represent each portion of the text string. Speech recognizer 240 also assigns a confidence score to the selected candidate word, where the confidence score represents a probability that the selected candidate word matches a corresponding portion of the audio stream, according to an embodiment. Speech recognition engines that assign confidence scores to candidate words are known by a person of ordinary skill in the relevant art.

Based on a value of the confidence score for a selected candidate word, text update manager 250 is configured to replace a word from the one or more typed words with the corresponding selected candidate word, according to an embodiment. In an embodiment, if the confidence score for the selected candidate word is above a predetermined threshold value, then the selected candidate word replaces the corresponding word from the one or more typed words. Text update manager 250 is configured to display, via display 260, a correction in the one or more typed words using the selected candidate word, according to an embodiment.

Figure 3:
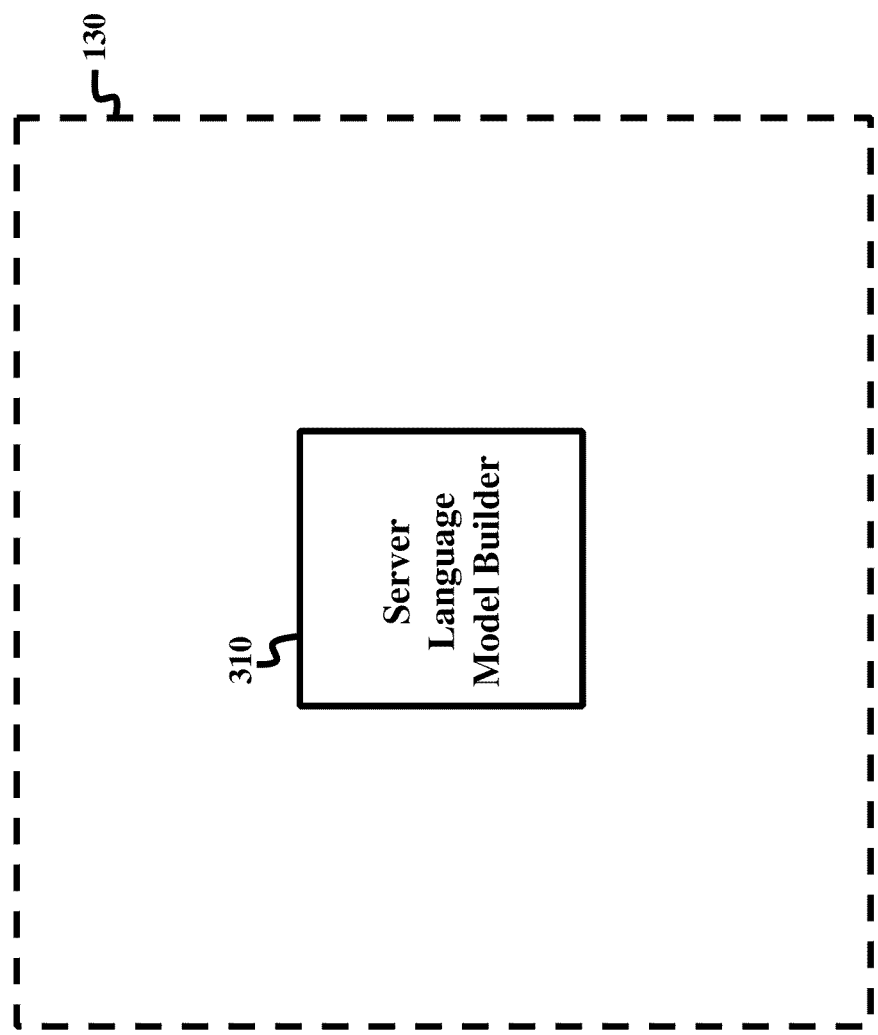
FIG. 3 is an illustration of an embodiment of a server device.

FIG. 3 is an illustration of an embodiment of server device 130. Server device 130 includes a server language model builder 310. In an embodiment, server language model builder 310 can be implemented in software, firmware, hardware, or a combination thereof. Embodiments of server language model builder 310, or portions thereof, can also be implemented as computer-readable code executed on one or more computing devices capable of carrying out the functionality described herein. Examples of computing devices include, but are not limited to, a central processing unit, an application-specific integrated circuit, or other type of computing device having at least one processor and memory.

As described above, with respect to FIG. 2, server device 130 can receive the one or more typed words received by text input device 210 of FIG. 2. In an embodiment, server language model builder 310 is configured to generate one or more candidate words for each of the typed words. In addition to the candidate words generated by client language model builder 220 of FIG. 2, it may be desirable for server language model builder 310 of FIG. 3 to generate additional candidate words to be considered by speech recognizer 240 of FIG. 2 when selecting candidate words. In an embodiment, server language model builder 310 can generate a larger set of candidate words for each of the typed words since server language model builder 310 has more computational and memory resources than client language model builder 220 of FIG. 2.

The larger set of candidate words generated by server language model builder 310 can be transmitted to client device 110 for consideration by speech recognizer 240 of FIG. 2, according to an embodiment. The transmission of data to and reception of data from client device 110 can be performed using a transceiver (not shown) located in server device 130, which is known by a person of ordinary skill in the relevant art.

Figure 4:
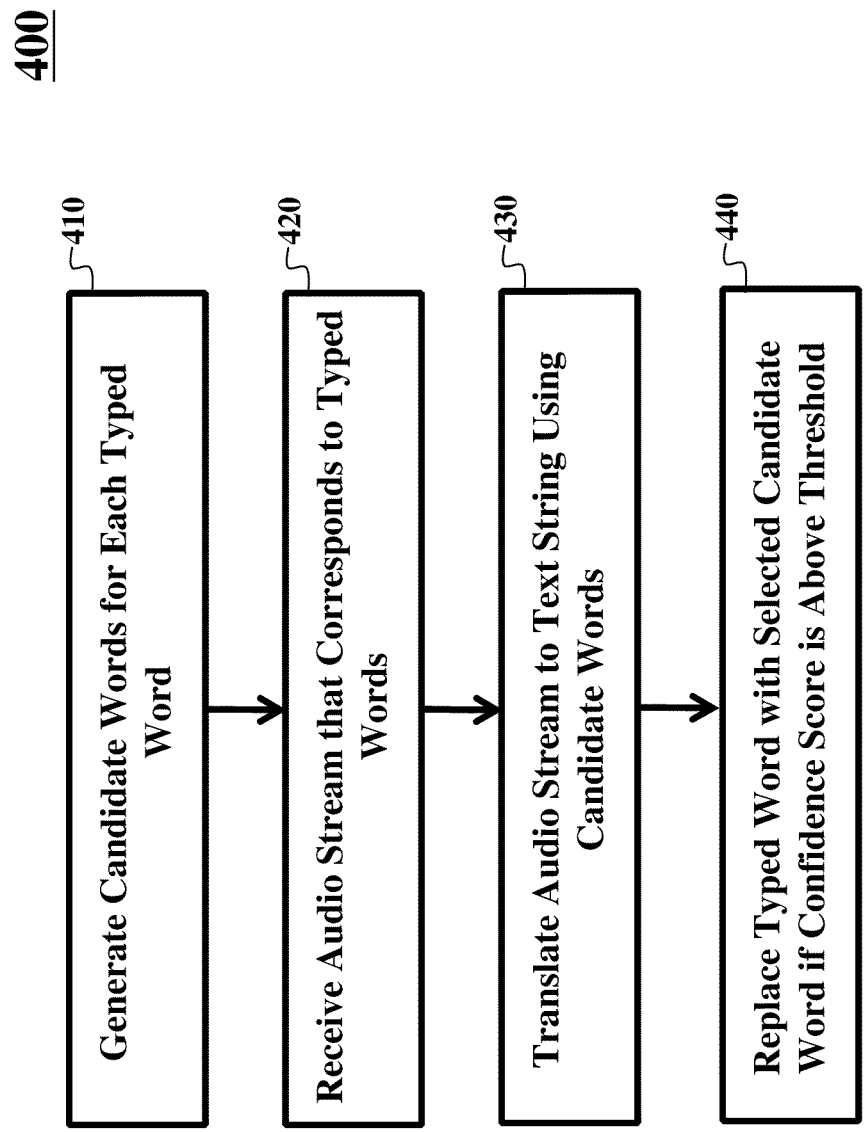
FIG. 4 is an illustration of an embodiment of a method for correcting one or more typed words on an electronic device.

FIG. 4 is an illustration of an embodiment of a method 400 for correcting one or more typed words on an electronic device. Method 400 can occur using, for example, client device 110 in communication system 100 of FIG. 1. Benefits of embodiments of method 400, among others, are hands-free correction of errors in the typed input on client device 110 and that the errors can be corrected expeditiously since the speech recognition capabilities of method 400 are based on a predetermined vocabulary set of words. The expeditious manner in which method 400 corrects errors in the typed input leads to improved user experience.

For ease of explanation, communication system 100 will be used to facilitate in the description of method 400. However, based on description herein, a person of ordinary skill in the relevant art will recognize that method 400 can be executed on other communication systems. These other communication systems are within the scope and spirit of the embodiments described herein.

Further, for ease of explanation, method 400 will be described in the context of a mobile phone (e.g., client device 110 of FIG. 1) with a mobile phone user as the audio source of audio stream that corresponds to one or more words typed into the mobile phone. The mobile phone is communicatively coupled to a network server (e.g., server device 130 of FIG. 1) via a communications network (e.g., network 120 of FIG. 1). Based on the description herein, a person of ordinary skill in the relevant art will recognize that method 400 can be executed on other types of client devices such as, for example and without limitation, a PDA, a laptop, and similar types of mobile devices. These other types of client devices are within the scope and spirit of the embodiments described herein.

In step 410, one or more candidate words are generated for each of the one or more typed words. As described above, with respect to FIG. 2, text input device 210 can be used to enter the one or more typed words into client device 110, display 260 can be used to display the typed words, and client language model builder 220 can be used to generate the one or more candidate words.

Further, in an embodiment, a language model builder in the network server (e.g., server language model builder 310 of FIG. 3) can be used to generate candidate words. The additional candidate words generated by the network server can be transmitted to the language model builder of the mobile phone (e.g., client language model builder 220 of FIG. 2) via the communications network, in which the candidate words from the network server can be used in conjunction with the candidate words generated by the language model builder in the mobile phone for the translation process of method 400, which is described in further detail below with respect to step 430.

However, depending on the preferences of the mobile phone user and implementation of communications system 100, it may not be desirable to use the network server to generate candidate words for the one or more words typed into the mobile phone. For instance, due to a latency in transmitting the typed words to the network server and receiving the corresponding candidate words from the network server, this latency may lead to a poor experience for the mobile phone user. In this case, in an embodiment, it may be desirable for the mobile phone to select the candidate words generated from its local language model builder (e.g., client language model builder 220 of FIG. 2) rather than candidate words generated from the combination of its local language model builder and the language model builder at the network server (e.g., server language model builder 310 of FIG. 3).

Figure 5:
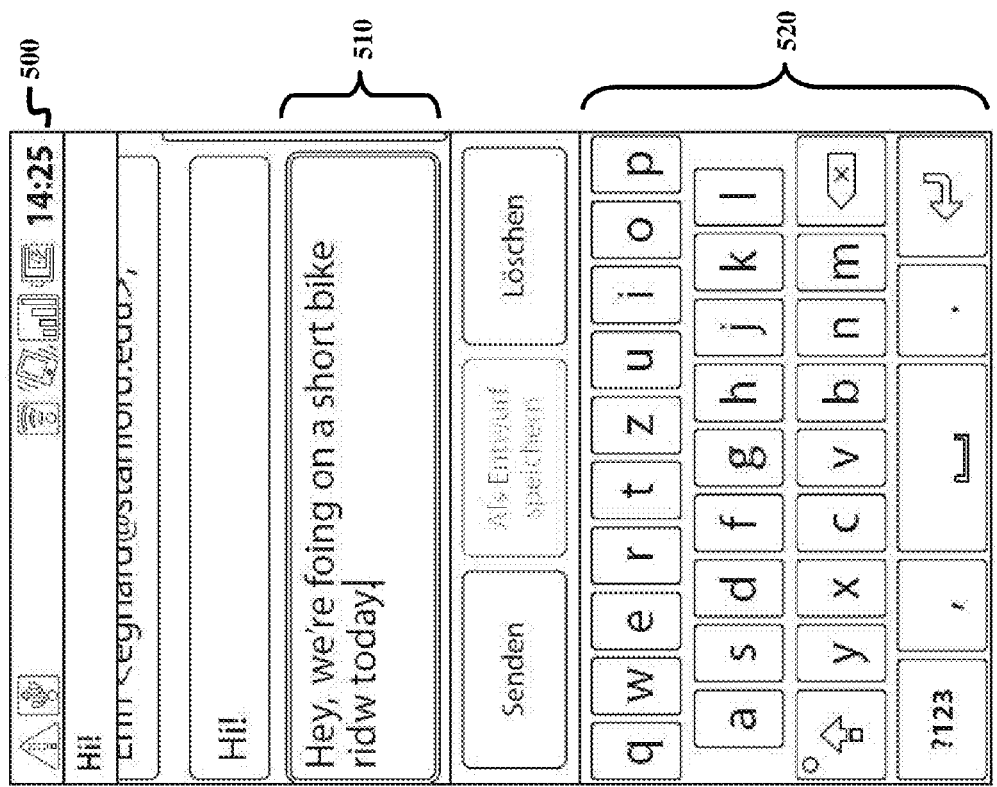
FIG. 5 is an illustration of an exemplary display on a mobile phone in accordance with embodiments.

FIG. 5 is an illustration of an exemplary display 510 on a mobile phone 500 in accordance with embodiments described herein. FIG. 5 is used to help facilitate in the explanation of step 410 of FIG. 4. Here, with the use of a keyboard 520, the mobile phone user has typed the following phrase on mobile phone 500: "Hey, we're foing on a short bike ridw today." The exemplary typed phrase on mobile phone 500 contains two errors—the misspelled words "foing" and "ridw." An objective of method 400, among others, is to correct these misspellings based on an audio input from the mobile phone user.

Figure 6:
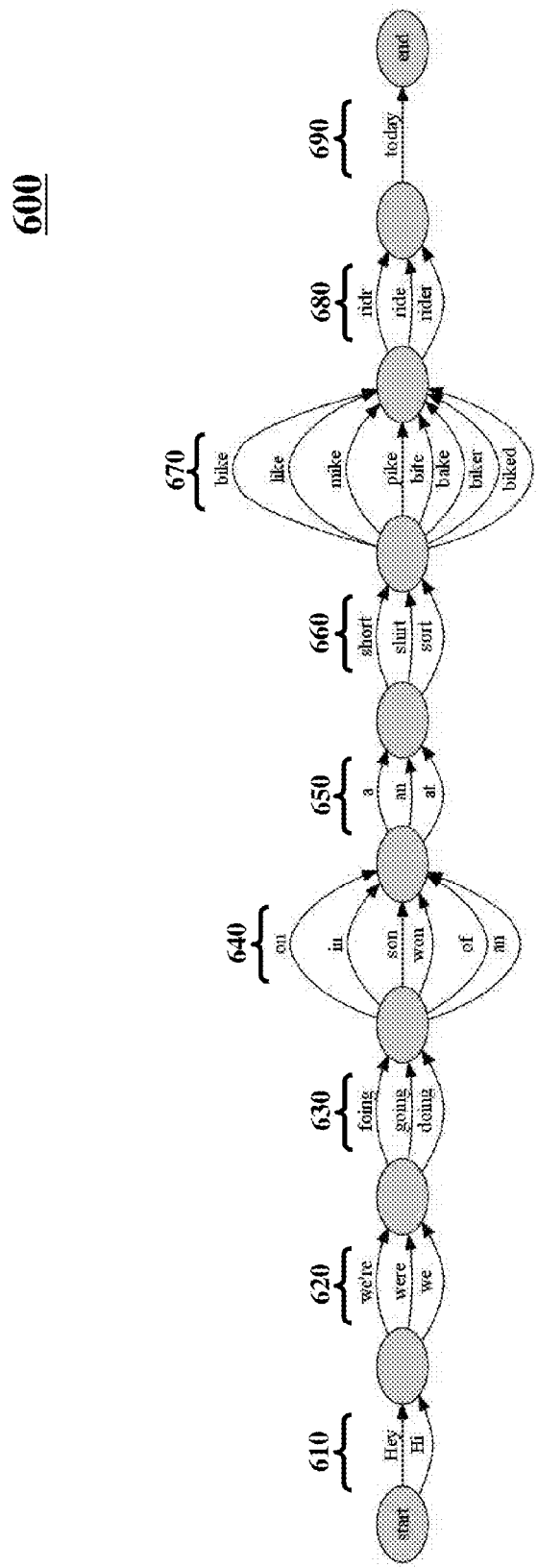
FIG. 6 is an illustration of an embodiment of a language model generated based on a typed input.

Based on the typed input, a language model builder in mobile phone 500 generates one or more candidate words for each of the typed words. FIG. 6 is an illustration of an embodiment of a language model 600 generated based on the typed input in display 510 of FIG. 5. Language model 600 provides one or more candidate words for each of the one or more typed words in display 510 (e.g., fields 610-690). In an embodiment, language model 600 uses a vocabulary set of words or dictionary of words stored in mobile phone 500 to generate candidate words.

In an embodiment, a finite state transducer (FST) can be used to represent language model 600, which contains the one or more candidate words for the typed words in display 510 of FIG. 5. In reference to language model 600 of FIG. 6, for each of the typed words, an arc is added for the typed word. For instance, in field 610, an arc is added for the typed word "Hey." Likewise, in field 620, an arc is added for the typed word "we're." Further, in field 630, an arc is added for the typed word "foing." Each of the subsequent fields 640-690 also contains an arc with their respective typed word "on," "a," "short," "bike," "ridr," and "today," as illustrated in language model 600 of FIG. 6.

In an embodiment, additional arcs can be added to each of the fields 610-690 of FIG. 6 based on an edit distance between a candidate word and its corresponding typed word. For ease of explanation, an edit distance of two characters will be assumed for exemplary purposes. In field 610, language model 600 is an example FST language model generated by the language model builder of mobile phone 500 (e.g., client language model builder 220 of FIG. 2). For example, the language model builder of mobile phone 500 analyzes the typed word "Hey" for other words stored in mobile phone 500 that are similar to the typed word "Hey" but whose spellings are within the two-character edit distance. For instance, the candidate word "Hi" is within the two-character edit distance for the typed word "Hey." In particular, in deleting the letters "e" and "y" from the typed word "Hey" and replacing the deleted letters with the single letter "i," two characters of the word "Hey" are edited in order to generate the candidate word "Hi." Therefore, the language model builder of mobile phone 500 adds an arc to "Hey" containing the word "Hi."

With respect to field 630, candidate words "going" and "doing" may be an output of language model 600 for the typed word "foing" since replacing the "f" in "foing" with a "g" to generate "going" the edit distance between the typed word "foing" and the candidate word "going" is within a two-character edit distance. Likewise, in reference to field 630, the candidate word "doing" is within a two-character edit distance from the typed word "foing."

In another example, with respect to field 680, candidate words "ride" and "rider" are within the two-character edit distance of the typed word "ridr." In an embodiment, candidate words are found for each of the typed words. In particular, candidate words can be found for the typed words "we're," "on," "a," "short," and "bike" in fields 620, 640, 650, 660, and 670 of FIG. 6, respectively.

However, depending on the size of the vocabulary set of words or dictionary of words stored in mobile phone 500 and the edit distance between the typed word and the candidate word (e.g., two-character edit distance), language model 600 may not return a candidate word for the typed word. For instance, in reference to field 690 of FIG. 6, the language model builder of mobile phone 500 does not return a candidate word for the typed word "today" since language model builder cannot find a potential candidate word in the vocabulary set of words stored in mobile phone 500 that is within the two-character edit distance limitation. Thus, in this example, language model 600 only contains a single arc for the word "today."

In another embodiment, additional arcs can be added to each of the fields 610-690 of FIG. 6 based on a location of neighboring keys in keyboard 520 of FIG. 5. For example, for the typed word "foing" in field 630 of FIG. 6, language model 600 can output candidate words "going" and "doing" since these candidate words are not only in the vocabulary set of words stored in mobile phone 500 but also the "g" and "d" keys in keyboard 520 are adjacent to the "f" key, thus resulting in candidate words "going" and "doing."

Based on the description herein, a person of ordinary skill in the relevant will recognize that tradeoffs exist between computational, memory, and battery resources of mobile phone 500 when generating candidate words for each of the typed words. That is, for a larger set of vocabulary words or dictionary of words to be stored in mobile phone 500 (e.g., via non-volatile memory of mobile phone 500), memory resources may need to be increased in the mobile phone. Similarly, for the generation of candidate words with a larger edit distance (e.g., three- and four-character edit distance from the typed word), computational resources may need to be increased in the mobile phone as well. Consequently, if computational resources are increased, then power consumption may increase accordingly. In an embodiment, the tradeoffs between these resources and other resources of mobile phone 500 can be specific to the implementation of the mobile phone and can be designed for optimal performance.

In an embodiment, a language model builder at the network server associated with mobile phone 500 (e.g., server language model builder 310 of FIG. 3) can be also be used to generate candidate words. A benefit, among others, of generating additional candidate words with the language model builder at the network server is that the network server typically has greater computational and memory resources than mobile phone 500, resulting in a larger number of candidate words with a longer edit distance than candidate words generated by the language model builder in mobile phone 500. However, the latency in transmitting the typed words to the network server and receiving the corresponding candidate words from the network server may lead to a poor experience for the mobile phone user. In this case, in an embodiment, it may be desirable for mobile phone 500 to select the candidate words generated from its local language model builder rather than candidate words generated from the combination of its local language model builder and the language model builder at the network server.

In reference to step 420 of FIG. 4, an audio stream that corresponds to the one or more typed words is received by the mobile phone. In reference to FIG. 2, microphone 230 can be used to receive the audio stream from the mobile phone user at substantially the same time, soon after, or during the period of time that the one or more typed words are received by the mobile phone and provide the audio information to speech recognizer 240 for further processing. For instance, once the mobile phone user starts typing text into the mobile phone, the mobile phone can activate microphone 230 to begin detection of voice activity from the mobile phone user.

In step 430, the audio stream (from step 420) is translated into a text string using the one or more candidate words (from step 410). In an embodiment, the translation process of step 430 involves selection of a candidate word among the one or more candidate words to represent each portion of the text string and assignment of a confidence score to the selected candidate word. The confidence score represents a probability that the selected candidate word matches a corresponding portion of the audio stream.

Speech recognizer 240 of FIG. 2 can be used, for example, to translate the audio stream into the text string using the one or more candidate words, where speech recognizer 240 is configured to extract portions of the audio stream that reasonably match the one or more typed words, according to an embodiment. In an embodiment, in addition to the misspelled words, the mobile phone user may also utter one or more correct words that surround the misspelled words in order to provide context for speech recognizer 240. In turn, speech recognizer 240 can accurately extract one or more portions of the audio stream that correspond to the one or more typed words. Context-based speech recognition methods and techniques are known to a person of ordinary skill in the relevant art.

In an embodiment, with respect to the audio stream received by the mobile phone, the mobile phone's speech recognizer analyzes the audio data and converts it into a digital representation of the spoken or uttered word. The digital representation of the spoken word can be compared to the one or more candidate words corresponding to each of the typed words, according to an embodiment. Methods and techniques of speech recognition systems to analyze speech and convert audio data into a digital representation of the speech are known to a person of ordinary skill in the relevant art.

For instance, the mobile phone user may speak the typed words, or a portion thereof, into the microphone of the mobile phone such as, for example, "we're going on a short bike ride." Here, the typed words "Hey" and "today" are not uttered by the mobile phone user. A digital representation of each of the spoken words is generated by the mobile phone. In turn, the digital representation for the spoken word "we're" is compared to the three candidate words in field 620 of FIG. 6 (i.e., "we're," "were," and "we"). The digital representation for the spoken word "going" is also compared to the three candidate words in field 630 of FIG. 6 (i.e., "foing," "going," and "doing"). In a similar manner, the digital representation for the remainder of the spoken words (i.e., "on," "a," "short," "bike," "ride") are compared to their respective candidate words (i.e., fields 640-680 of FIG. 6, respectively).

A benefit, among others, in comparing the digital representation of the spoken word to its respective candidate words is the size of the vocabulary set used for speech recognition. In particular, the vocabulary set is limited to the words in language model 600 of FIG. 6. In turn, the mobile phone is not required to expend intensive computational, memory, and battery resources to generate the vocabulary set for speech recognition since the vocabulary set of language model 600 is generated from likely corrections to the typed text.

In comparing the digital representation of the spoken word to its respective candidate words, a confidence score can be assigned to each of the candidate words, according to an embodiment. The confidence score represents a probability that the candidate word matches the digital representation of the spoken word. In an embodiment, each of the candidate words can be broken down into small sets of speech sounds or pronunciation symbols (e.g., phonemes), where each pronunciation symbol is compared to a corresponding pronunciation symbol from the digital representation of the spoken word. Depending on the likelihood of a match of one or more of the pronunciation symbols between the candidate word and the digital representation of the spoken word, a percentage score representative of the confidence score can be assigned to the candidate word, according to an embodiment. Scoring techniques and methods in the assignment of confidence scores in speech recognition systems are known to a person of ordinary skill in the relevant art.

In returning to the example above in which the mobile phone user uttered the phrase "we're going on a short bike ride," the spoken word "we're" can be compared to each of its respective candidate words in field 620 of FIG. 6, where a confidence score is assigned to each of the candidate words. For instance, a confidence score of 95% can be assigned to the candidate word "we're," a confidence score of 75% can be assigned to the candidate word "were," and a confidence score of 20% can be assigned to the candidate word "we." In another example, the spoken word "going" can be compared to each of its respective candidate words in field 630 of FIG. 6. For instance, a confidence score of 40% can be assigned to the candidate word "foing," a confidence score of 95% can be assigned to the candidate word "going," and a confidence score of 70% can be assigned to the candidate word "doing." In a similar manner, confidence scores can be assigned to the remainder of the words in the uttered phrase by the mobile phone user. Based on the description, a person of ordinary skill in the relevant will recognize that the numeric value of the above-described confidence scores are for exemplary purposes and that these numeric values an vary depending on a variety of factors such as, for example and without limitation, the implementation of the speech recognizer in the mobile phone (e.g., speech recognizer 240 of FIG. 2), the quality of the microphone (e.g., microphone 230 of FIG. 2) used to receive the uttered phrase from the mobile phone user, and the environment in which the mobile phone user utters the phrase into the microphone (e.g., noisy versus quiet background environment).

Based on the confidence score assigned to each of the candidate words, a candidate word can be selected to correspond to its respective uttered word. In an embodiment, the selected candidate word can be a candidate word with the highest confidence score among its group of candidate words. For instance, the candidate word "we're" can be selected from field 620 of FIG. 6 to correspond to the uttered word "we're" since this candidate word has the highest confidence score among the other candidate words in field 620. Likewise, the candidate word "going" can be selected from field 630 of FIG. 6 to correspond to the uttered word "going" since this candidate word has the highest confidence score among the other candidate words in field 630. In a similar manner, based on its confidence score, a candidate word can be selected for each of the uttered words.

In reference to step 440 of FIG. 4, a word from the one or more typed words is replaced with its corresponding selected candidate word when the confidence score of the selected candidate word is above a predetermined threshold value. In an embodiment, the value of the predetermined threshold can be specific to the design of the mobile phone and can vary depending on a variety of factors such as, for example and without limitation, the design of the mobile phone's language model builder (e.g., client language model builder 220 of FIG. 2) and the quality of the mobile phone's microphone (e.g., microphone 230 of FIG. 2). In an embodiment, if the mobile phone's language model builder receives additional candidate words from language model builder at the network server (e.g., server language model builder 310 of FIG. 3), then the predetermined threshold may have a lower value than a threshold value associated with candidate words generated only from the mobile phone's language model builder. This is because the language model builder at the network server typically has greater computational and memory resources than the mobile phone, resulting in a larger set of candidate words that the speech recognizer of the mobile can choose from.

For explanation purposes, a predetermined threshold value of 90% will be assumed. Based on the description herein, a person of ordinary skill in the relevant art will recognize that other predetermined threshold values can be used. In addition, based on the description herein, a person of ordinary skill in the relevant art will recognize that, depending on environmental factors, the predetermined threshold value can adaptively change to suit the environment. For instance, if the microphone of the mobile receives a significant amount of static noise, then the mobile phone can classify the background as a noisy environment and raise the predetermined threshold value. On the other hand, if the microphone of the mobile phone receives very little or no static noise, then the mobile phone can classify the background as a quiet environment and lower the predetermined threshold value.

Based on the confidence score for a selected candidate word (from step 430), a text update manager of the mobile phone (e.g., text update manager 250 of FIG. 2) can be used to replace a typed word with its corresponding selected candidate word. In reference to the example uttered phrase "we're going on a short bike ride," if the confidence score for the selected candidate word "going" is above 90%, then the text update manager replaces the typed word "foing" with the selected candidate word "going," according to an embodiment. The text update manager displays the selected candidate word with the confidence score above the predetermined threshold value on the mobile phone's display (e.g., display 260 of FIG. 2). However, if the confidence score for the selected candidate word is below the predetermined threshold value, then the text update manager does not replace the corresponding typed word with the selected candidate word and the originally-typed word remains on the display of the mobile phone, according to an embodiment.

Figure 7:
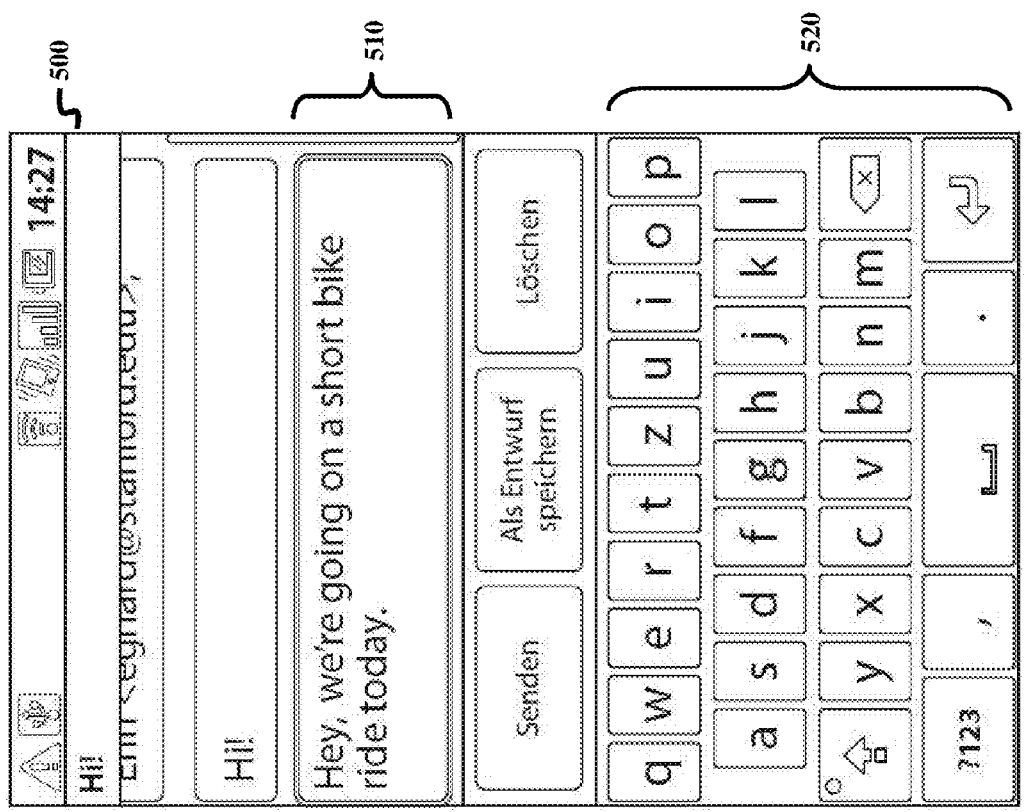
FIG. 7 is an illustration of another exemplary display on a mobile phone in accordance with embodiments.

FIG. 7 is an illustration of exemplary display 510 of mobile phone 500 in accordance with embodiments described herein. FIG. 7 is used to help facilitate in the explanation of step 440 of FIG. 4. Here, based on the above-description of steps 430 and 440, misspelled words "foing" and "ridw" are replaced with "going" and "ride," respectively. As noted above, an objective of method 400, among others, is to correct the misspelled words based on an audio input from the mobile phone user.

In summary, embodiments of method 400 provide hands-free correction of errors in the typed input on the mobile phone. A benefit, among other, of method 400 is that these errors can be corrected expeditiously since the speech recognition capabilities of method 400 are based on a predetermined vocabulary set of words.

Figure 8:
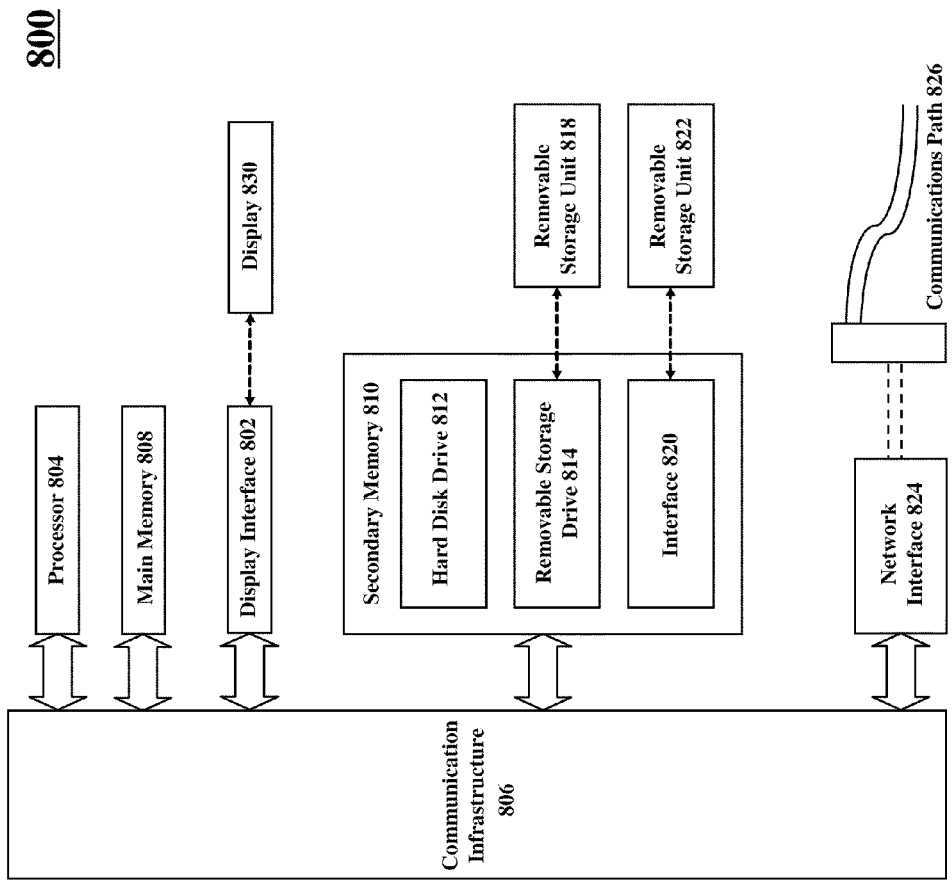
FIG. 8 is an illustration of an example computer system in which embodiments can be implemented.

Various aspects of the embodiments described herein may be implemented in software, firmware, hardware, or a combination thereof. FIG. 8 is an illustration of an example computer system 800 in which embodiments described herein, or portions thereof, can be implemented as computer-readable code. For example, the methods illustrated by flowchart 400 of FIG. 4 can be implemented in computer system 800. Various embodiments are described in terms of this example computer system 800. After reading this description, it will become apparent to a person skilled in the relevant art how to implement embodiments described herein using other computer systems and/or computer architectures.

Computer system 800 includes one or more processors, such as processor 804. Processor 804 may be a special purpose or a general-purpose processor. Processor 804 is connected to a communication infrastructure 806 (e.g., a bus or network).

Computer system 800 also includes a main memory 808, preferably random access memory (RAM), and may also include a secondary memory 810. Secondary memory 810 can include, for example, a hard disk drive 812, a removable storage drive 814, and/or a memory stick. Removable storage drive 814 can comprise a floppy disk drive, a magnetic tape drive, an optical disk drive, a flash memory, or the like. The removable storage drive 814 reads from and/or writes to a removable storage unit 818 in a well-known manner. Removable storage unit 818 can include a floppy disk, magnetic tape, optical disk, etc. which is read by and written to by removable storage drive 814. As will be appreciated by persons skilled in the relevant art, removable storage unit 818 includes a computer-usable storage medium having stored therein computer software and/or data.

In alternative implementations, secondary memory 810 can include other similar devices for allowing computer programs or other instructions to be loaded into computer system 800. Such devices can include, for example, a removable storage unit 822 and an interface 820. Examples of such devices can include a program cartridge and cartridge interface (such as those found in video game devices), a removable memory chip (e.g., EPROM or PROM) and associated socket, and other removable storage units 822 and interfaces 820 which allow software and data to be transferred from the removable storage unit 822 to computer system 800.

Computer system 800 can also include a communications interface 824. Communications interface 824 allows software and data to be transferred between computer system 800 and external devices. Communications interface 824 can include a modem, a network interface (such as an Ethernet card), a communications port, a PCMCIA slot and card, or the like. Software and data transferred via communications interface 824 are in the form of signals, which may be electronic, electromagnetic, optical, or other signals capable of being received by communications interface 824. These signals are provided to communications interface 824 via a communications path 826. Communications path 826 carries signals and may be implemented using wire or cable, fiber optics, a phone line, a cellular phone link, a RF link or other communications channels.

In this document, the terms "computer program medium" and "computer-usable medium" are used to generally refer to media such as removable storage unit 818, removable storage unit 822, and a hard disk installed in hard disk drive 812. Computer program medium and computer-usable medium can also refer to memories, such as main memory 808 and secondary memory 810, which can be memory semiconductors (e.g., DRAMs, etc.). These computer program products provide software to computer system 800.

Computer programs (also called computer control logic) are stored in main memory 808 and/or secondary memory 810. Computer programs may also be received via communications interface 824. Such computer programs, when executed, enable computer system 800 to implement embodiments described herein. In particular, the computer programs, when executed, enable processor 804 to implement processes described herein, such as the steps in the methods illustrated by flowchart 400 of FIG. 4, discussed above. Accordingly, such computer programs represent controllers of the computer system 800. Where embodiments are implemented using software, the software can be stored in a computer program product and loaded into computer system 800 using removable storage drive 814, interface 820, hard drive 812 or communications interface 824.

Based on the description herein, a person of ordinary skill in the relevant will recognize that the computer programs, when executed, can enable one or more processors to implement processes described above, such as the steps in the method illustrated by flowchart 400 of FIG. 4. In an embodiment, the one or more processors can be part of a computing device incorporated in a clustered computing environment or server farm. Further, in an embodiment, the computing process performed by the clustered computing environment such as, for example, the steps in the method illustrated by flowchart 400 may be carried out across multiple processors located at the same or different locations.

Based on the description herein, a person of ordinary skill in the relevant will recognize that the computer programs, when executed, can enable multiple processors to implement processes described above, such as the steps in the method illustrated by flowchart 400 of FIG. 4. In an embodiment, the computing process performed by the multiple processors can be carried out across multiple processors located at a different location from one another.

Embodiments are also directed to computer program products including software stored on any computer-usable medium. Such software, when executed in one or more data processing device, causes a data processing device(s) to operate as described herein. Embodiments employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments have been described above, it should be understood that they have been presented by way of example only, and not limitation. It will be understood by those skilled in the relevant art that various changes in form and details can be made therein without departing from the spirit and scope of the embodiments described herein. It should be understood that this description is not limited to these examples. This description is applicable to any elements operating as described herein. Accordingly, the breadth and scope of this description should not be limited by any of the above-described exemplary embodiments, but should be defined only in accordance with the following claims and their equivalents.

What is claimed is:

1. A method for correcting one or more typed words on an electronic device, the method comprising:
    receiving multiple typed words from a text input device;
    generating one or more candidate words for each one of the multiple typed words;
    receiving a single audio stream containing multiple spoken words that correspond to the multiple typed words or a portion of the multiple typed words;
    translating the multiple spoken words into text using the one or more candidate words, wherein the translating comprises:
        generating a digital representation of each of the multiple spoken words;
        for each of the multiple spoken words, assigning a confidence score to each of the corresponding one or more candidate words by comparing the digital representation of the spoken word to the corresponding one or more candidate words; and
        for each of the multiple spoken words, selecting a candidate word from among the corresponding one or more candidate words based on the confidence score assigned to each of the corresponding one or more candidate words; and
    replacing, using the text, one or more of the multiple typed words with the corresponding selected candidate word when the confidence score of the selected candidate word is above a predetermined threshold value.

2. The method of claim 1, further comprising:
    displaying the multiple typed words on the electronic device.

3. The method of claim 1, wherein generating the one or more candidate words comprises generating the one or more candidate words with a finite state transducer (FST), wherein the FST represents a language model that contains the one or more candidate words.

4. The method of claim 3, wherein generating the one or more candidate words with the FST is based on an edit distance between a typed word from the multiple typed words and the corresponding one or more candidate words from the one or more candidate words.

5. The method of claim 1, wherein generating the one or more candidate words comprises generating the one or more candidate words based on a vocabulary set of words stored on the electronic device.

6. The method of claim 1, wherein generating the one or more candidate words comprises generating the one more candidate words based on a first vocabulary set of words stored on the electronic device and a second vocabulary set of words stored on a remote server device.

7. The method of claim 6, wherein generating the one or more candidate words based on the second vocabulary set of words comprises receiving a portion of the one or more candidate words from the remote server device.

8. The method of claim 1, wherein receiving the single audio stream comprises activating a microphone on the electronic device when the multiple typed words are received by the text input device.

9. The method of claim 1, wherein translating the multiple spoken words comprises:
    selecting the candidate word from two or more candidate words that correspond to each of the multiple typed words, wherein the selected candidate word has the highest confidence score among the two or more candidate words.

10. The method of claim 1, wherein replacing the one or more of the multiple typed words comprises displaying a correction in the one or more of the multiple typed words using the selected candidate word with the confidence score above the predetermined threshold value.

11. A computer program product comprising a computer-usable storage medium having computer program logic recorded thereon for enabling a processor to correct one or more typed words on an electronic device, the computer program logic comprising:
    first computer readable program code that enables a processor to receive multiple typed words from a text input device;
    second computer readable program code that enables a processor to generate one or more candidate words for each one of the multiple typed words;
    third computer readable program code that enables a processor to receive a single audio stream containing multiple spoken words that correspond to the multiple typed words or a portion of the multiple typed words;
    fourth computer readable program code that enables a processor to translate the multiple spoken words into text using the one or more candidate words, wherein the translation of the multiple spoken words comprises:
        generation of a digital representation of each of the multiple spoken words, for each of the multiple spoken words;
        for each of the multiple spoken words, assignment of a confidence score to each of the corresponding one or more candidate words by comparing the digital representation of the spoken word to the corresponding one or more candidate words; and
        for each of the multiple spoken words, selection of a candidate word from among the corresponding one or more candidate words based on the confidence score assigned to each of the corresponding one or more candidate words; and
    fifth computer readable program code that enables a processor to replace, using the text, one or more of the multiple typed words with the corresponding selected candidate word when the confidence score of the selected candidate word is above a predetermined threshold value.

12. The computer program product of claim 11, further comprising:
   sixth computer readable program code that enables a processor to display the multiple typed words on the electronic device.

13. The computer program product of claim 11, wherein the second computer readable program code comprises:
   sixth computer readable program code that enables a processor to generate the one or more candidate words with a finite state transducer (PST), wherein the PST represents a language model that contains the one or more candidate words.

14. The computer program product of claim 13, wherein the sixth computer readable program code comprises:
   seventh computer readable program code that enables a processor to generate the multiple typed words and the corresponding one or more candidate words from the one or more typed words and a corresponding candidate word from the one or more candidate words.

15. The computer program product of claim 11, wherein the second computer readable program code comprises:
   sixth computer readable program code that enables a processor to generate the one or more candidate words based on a vocabulary set of words stored on the electronic device.

16. The computer program product of claim 11, wherein the second computer readable program code comprises:
   sixth computer readable program code that enables a processor to generate the one or more candidate words based on a first vocabulary set of words stored on the electronic device and a second vocabulary set of words stored on a remote server device.

17. The computer program product of claim 16, wherein the sixth computer readable program code comprises:
   seventh computer readable program code that enables a processor to receive a portion of the one or more candidate words from the remote server device.

18. The computer program product of claim 11, wherein the third computer readable program code comprises:
   sixth computer readable program code that enables a processor to activate a microphone on the electronic device when the multiple typed words are received by the text input device.

19. The computer program product of claim 11, wherein the fourth computer readable program code comprises:
   sixth computer readable program code that enables a processor to select the candidate word from two or more candidate words that correspond to each of the multiple typed words, wherein the selected candidate word has the highest confidence score among the two or more candidate words.

20. The computer program product of claim 11, wherein the fifth computer readable program code comprises:
   sixth computer readable program code that enables a processor to display a correction in the one or more of the multiple typed words using the selected candidate word with the confidence score above the predetermined threshold value.

21. A system for correcting one or more typed words on an electronic device, the system comprising:
   a text input device configured to receive multiple typed words;
   a language model builder configured to generate one or more candidate words for each one of the multiple typed words;
   a microphone configured to receive a single audio stream containing multiple spoken words that correspond to the multiple typed words or a portion of the multiple typed words;
   a speech recognizer configured to:
      translate the multiple spoken words into text using the one or more candidate words, wherein translation of the multiple spoken words comprises generation of a digital representation of each of the multiple spoken words;
      for each of the multiple spoken words, assign a confidence score to each of the corresponding one or more candidate words by comparing the digital representation of the spoken word to the corresponding one or more candidate words; and,
      for each of the multiple spoken words, select a candidate word from among the corresponding one or more candidate words based on the confidence score assigned to each of the corresponding one or more candidate words; and
   a text update manager configured to replace, using the text, one or more of the multiple typed words with the corresponding selected candidate word when the confidence score of the selected candidate word is above a predetermined threshold value.

22. The system of claim 21, further comprising:
   a display configured to display the multiple typed words.

23. The system of claim 21, wherein the language model builder is configured to generate the one or more candidate words with a finite state transducer (FST), wherein the FST represents a language model that contains the one or more candidate words.

24. The system of claim 23, wherein the language model builder is configured to generate the one or more candidate words with the FST based on an edit distance between a typed word from multiple typed words and the corresponding one or more candidate words from the one or more candidate words.

25. The system of claim 21, wherein the language model builder is configured to generate the one or more candidate words based on a vocabulary set of words stored on the electronic device.

26. The system of claim 21, wherein the language model builder is configured to generate the one or more candidate words based on a first vocabulary set of words stored on the electronic device and a second vocabulary set of words stored on a remote server device.

27. The system of claim 26, wherein the language model builder is configured to receive a portion of the one or more candidate words from the remote server device.

28. The system of claim 21, wherein the microphone is configured to receive the single audio stream when the multiple typed words are received by the text input device.

29. The system of claim 21, wherein the speech recognizer is configured to select the candidate word from two or more candidate words that correspond to each of the multiple typed words, wherein the selected candidate word has the highest confidence score among the two or more candidate words.

30. The system of claim 21, wherein the text update manager is configured to display a correction in the one or more of the multiple typed words using the selected candidate word with the confidence score above the predetermined threshold value.

* * * * *